United States Patent
Nuccitelli

(10) Patent No.: US 7,562,908 B2
(45) Date of Patent: Jul. 21, 2009

(54) FLEXIBLE FLUID CONDUIT JOINT AND METHOD

(75) Inventor: Dominic S. Nuccitelli, Granada Hills, CA (US)

(73) Assignee: Raytheon Comapny, Waltham, MA (US)

( * ) Notice: Subject to any disclaimer, the term of this patent is extended or adjusted under 35 U.S.C. 154(b) by 418 days.

(21) Appl. No.: 11/343,675

(22) Filed: Jan. 31, 2006

(65) Prior Publication Data

US 2007/0176417 A1    Aug. 2, 2007

(51) Int. Cl.
*F16L 21/00*    (2006.01)
(52) U.S. Cl. .................................. 285/226; 285/114
(58) Field of Classification Search ............. 285/145.5, 285/57, 226, 227, 228, 299, 114
See application file for complete search history.

(56) References Cited

U.S. PATENT DOCUMENTS

| | | | | |
|---|---|---|---|---|
| 2,314,776 A | * | 3/1943 | Dittus et al. .................. | 285/228 |
| 2,758,612 A | * | 8/1956 | Zaleski ........................ | 285/114 |
| 2,822,193 A | * | 2/1958 | Wiethuchter et al. ......... | 285/114 |
| 3,381,303 A | * | 5/1968 | Hazard ........................ | 285/227 |
| 5,248,170 A | * | 9/1993 | Francis ........................ | 285/114 |
| 5,299,840 A | * | 4/1994 | Heye ........................... | 285/114 |
| 6,588,804 B2 | * | 7/2003 | McGrath ...................... | 285/299 |
| 2005/0006895 A1 | * | 1/2005 | Muroi et al. ................. | 285/226 |
| 2007/0216156 A1 | * | 9/2007 | Chou et al. .............. | 285/145.5 |

* cited by examiner

*Primary Examiner*—Aaron M Dunwoody
(74) *Attorney, Agent, or Firm*—Leonard A. Alkov

(57) ABSTRACT

A flexible fluid conduit joint includes two or more flexible sections that preferentially bend about respective preferential bend axes of the sections. The sections each include a flexible bellows coupled at longitudinal ends to a pair of annular collars, and a pair of blade flexures or plates that are also attached to the annular collars. The blade flexures or plates prevent longitudinal expansion of the bellows, and inhibit bending of the flexible sections about an axis that is perpendicular to the plane or planes that the flexures define. Flexing of each section is thus preferentially channeled into a preferentially bending axis within or parallel to the plane or planes defined by the flexures. The sections have different orientations for their blade flexures or plates, allowing the flexible joint to act as a two-axis pivot that does not expand under fluid pressure.

20 Claims, 3 Drawing Sheets

FLEXIBLE FLUID CONDUIT JOINT AND METHOD

RIGHTS IN INVENTION

This invention was made with support from a Government Contract. The United States Government may have certain rights to this invention.

BACKGROUND OF THE INVENTION

1. Technical Field of the Invention

The invention is in the field of flexible fluid conduit joints.

2. Description of the Related Art

Many products have two functional components connected to each other by a gas or liquid fluid line under pressure. An example of such a connection is the connection of the compressor of a cryocooler to cooling components of the cryocooler. Such components may be mounted on separate platforms. Displacement between the separate platforms can cause excessive loads in a rigid fluid conduit that can induce loads onto each platform.

In the past, expandable joints have been provided in fluid lines under pressure by use of expandable bellows. One difficulty with use of bellows is that the bellows expand when a pressurized fluid is run through them. The expansion of the bellows under pressure puts additional stresses on the stacked diaphragms (convolutions) of the bellows. For significantly increased pressures, stronger material for the bellows may be required, which adds weight and reduces the ability of the bellows to expand, as well as reducing the flexibility of the bellows.

Another way of dealing with the expansion problem in the bellows has been to surround the bellows with an overbraid of material that constrains the bellows, to prevent the bellows from expanding too much. However, this has the disadvantage of adding additional material, which may add significant amounts of additional weight. In addition, constraining expansion of the bellows may limit flexibility of the conduit section.

From the foregoing, it will be appreciated that there is still room for improvement with regard to flexible conduit joints for enclosing pressurized fluids.

SUMMARY OF THE INVENTION

According to one aspect of the invention, a fluid conduit flexible joint includes a section that in turn includes a bellows and a constraint system for both constraining expansion of the bellows and for allowing preferential bending about a given axis. According to another aspect, multiple such sections may be joined together, with the various sections having differently-oriented preferential bending axes.

According to yet another aspect of the invention, a fluid conduit flexible joint includes a bellows and two or more blade flexures or plates that constrain longitudinal expansion of the bellows. According to still another aspect the blade flexures or plates allow preferential bending of the bellows about a preferential bending axis. According to a further aspect, the blade flexures or plates include a pair of diametrically-opposed flexures or plates. The diametrically-opposed flexures or plates may be substantially co-planar or may be substantially parallel to one another.

According to a still further aspect of the invention, a flexible fluid conduit joint includes: a bellows; and a constraint system mechanically coupled to the bellows. The constraint system constrains expansion of the bellows in an axial direction. The constraint system allows preferential bending of the bellows about a preferential bending axis.

According to another aspect of the invention, a fluid flow conduit joint includes: plural sections attached to each other, with each of the sections including: a bellows; and a constraint system mechanically coupled to the bellows. For each of the sections the constraint system constrains expansion of the bellows in an axial direction. For each of the sections the constraint system allows preferential bending of the bellows about a preferential bending axis. The preferential bending axes of the sections are canted relative to one another.

According to yet another aspect of the invention, a fluid flow conduit includes: a plurality of rigid pipe sections in fluid communication with one another; and a plurality of fluid flow joints between respective adjacent pairs of the rigid pipe sections. Each of the fluid flow joints includes one or more flexible sections. Each of the flexible sections includes: a bellows; and a constraint system mechanically coupled to the bellows. The constraint system constrains expansion of the bellows in an axial direction. The constraint system allows preferential bending of the bellows about a preferential bending axis.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the appended drawings, which are not necessarily to scale.

DETAILED DESCRIPTION

A flexible fluid conduit joint includes two or more flexible sections that preferentially bend about respective preferential bend axes of the sections. The sections each include a flexible bellows coupled at longitudinal ends to a pair of annular collars, and a pair of blade flexures or plates that are also attached to the annular collars. The blade flexures or plates prevent longitudinal expansion of the bellows, and inhibit bending of the flexible sections about an axis that is perpendicular to the plane or planes that the flexures define. Flexing of each section is thus preferentially channeled into a preferentially bending axis within or parallel to the plane or planes defined by the flexures. The flexures of each section may be diametrically opposite one another on opposite sides of the bellows, either outside of the bellows or within the bellows. The flexures or plates of each section may be substantially coplanar, or may define substantially parallel plates. The section of the conduit may be attached together, such as by welding. The sections have different orientations for their blade flexures or plates, allowing the flexible joint to act as a two-axis pivot that does not expand under fluid pressure. Several joints may be combined in a single fluid flow line to obtain six degrees of freedom of the relative location of the ends of the fluid flow line.

Figure 1:
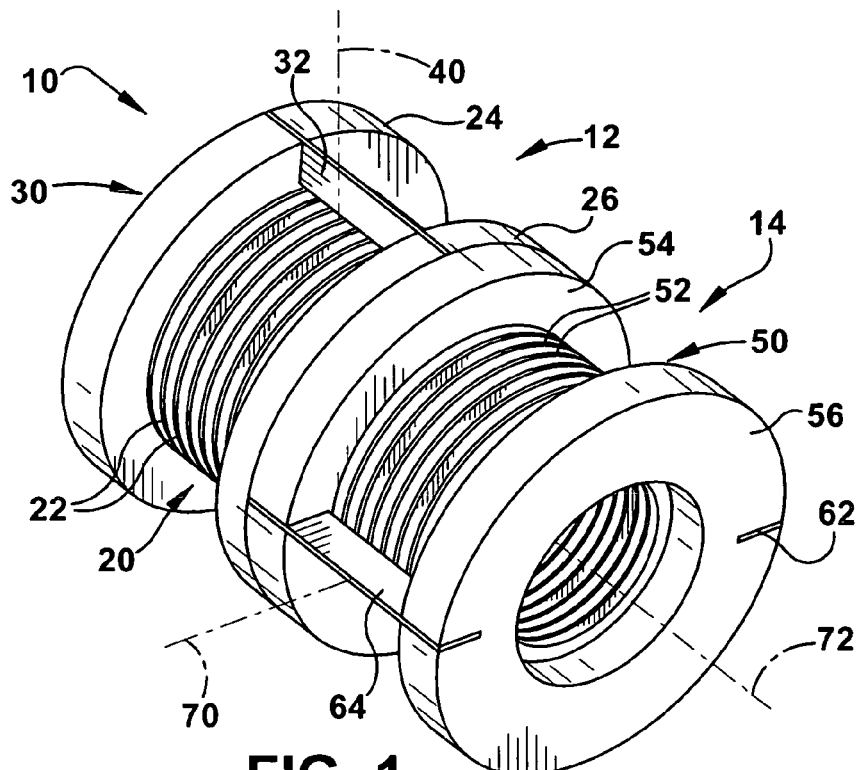
FIG. 1 is an oblique view of a fluid conduit flexible joint in accordance with the present invention.
Figure 2:
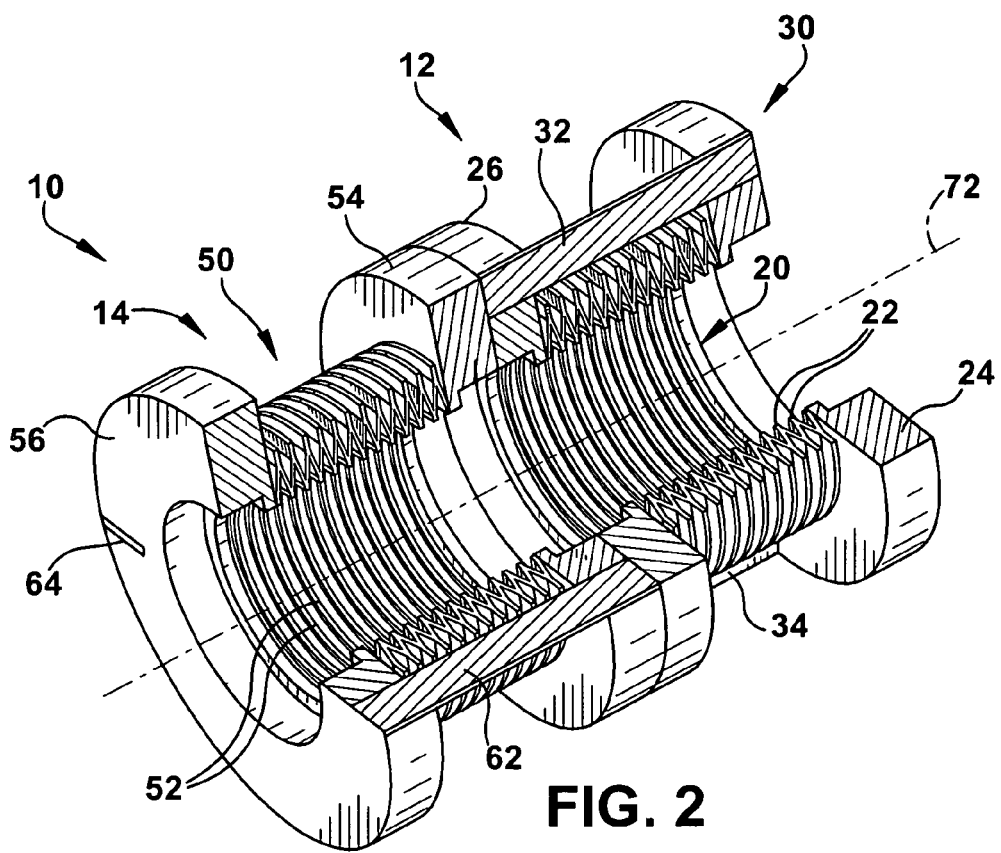
FIG. 2 is an oblique, partial cutaway view of the fluid conduit flexible joint of FIG. 1.

Referring initially to FIGS. 1 and 2, a fluid conduit flexible joint 10 includes a pair of flexible joint sections 12 and 14. The flexible joint section 12 includes a bellows 20 having multiple convolutions 22, annular collars 24 and 26 attached to opposite ends of the bellows 20, and a constraint system 30 for constraining movement of the bellows 20. The constraint system 30 includes a pair of blade flexures or plates 32 and 34. The blade flexures or plates 32 and 34 are attached at their opposite ends to the collars 24 and 26. In the illustrated embodiment, the flexible plates 32 and 34 are substantially co-planar. Attachment of the blade flexures 32 and 34 to the collars 24 and 26 prevents expansion of the bellows 20 in a longitudinal direction 38.

The plates 32 and 34 have a width that is much greater than their thickness. This means that bending of the bellows 20 in a preferential bending axis 40 is much easier than bending of the bellows 20 about a different bending axis. The preferential bending axis 40 is within a plane defined by the blade flexures or plates 32 and 34, and is substantially perpendicular to the longitudinal axis 38 of the flexible joint section 12.

The joint section 14 has similar parts to those described above for the flexible joint section 12: a bellows 50 having convolutions 52; annular collars 54 and 56 attached to ends of the bellows 50; and a constraint system 60 that includes a pair of blade flexures or plates 62 and 64 that preferentially bend about a bending axis 70.

In order to allow greater freedom of movement in the fluid conduit flexible joint 10, the preferential bending axes 40 and 70 of the sections 12 and 14 are not aligned with one another. The preferential bending axes 40 and 70 may be in respective directions that are substantially orthogonal with one another. Accordingly, the blade flexures or plates 62 and 64 may define a plane that is substantially perpendicular to a plane defined by the blade flexures 32 and 34. More broadly, the plane defined by the plates 62 and 64 is at a non-zero angle relative to the plane defined by the blade flexures or plates 32 and 34. Both of the axes 40 and 70 may be substantially orthogonal to a longitudinal axis 72 of the flexible joint 10.

With the flexible joint sections 12 and 14 having their different preferential bending axes 40 and 70, the fluid conduit flexible joint 10 acts as a two-axis pivot, able to bend without expanding over a large range of angles. For example, as illustrated, the flexible joint section 12 may allow bending within a horizontal plane, and the flexible joint section 14 may allow bending within a vertical section. Together the sections 12 and 14 may achieve a wide range of various angular tilts. This is achieved without axial expansion of the bellows 20 and 50.

The material for the bellows 20 and 50, the annular collars 24, 26, 54, and 56, and the blade flexures or plates 32, 34, 62, and 64, may be any of a variety of suitable materials. Examples of suitable materials are titanium, stainless steel, nickel, and beryllium copper. The bellows 20 and 50 may have any of a wide variety of sizes, for example ranging from about 3 mm (0.125 inches) to about 50 cm (20 inches) inside diameter. The bellows 20 and 50 may have any of a wide variety of suitable numbers of convolutions, for example ranging from a single convolution to 20 or more convolutions. The individual convolutions 22 and 52 of the bellows 20 and 50 may be diaphragms welded together, or alternatively may be coupled together in other suitable ways, such as being hydraulically formed, for instance in a sinusoidal wave pattern.

The bellows 20 and 50 may be welded to the annular collars, or may be coupled to the collars in other suitable ways. The sections 12 and 14 of the flexible fluid conduit 10 may be attached together by suitable welding or other connection of the collars 26 and 54. The collars may have suitable provisions for coupling the flexible fluid joint 10 to other conduits, such as rigid pieces of pipe.

Figure 3:
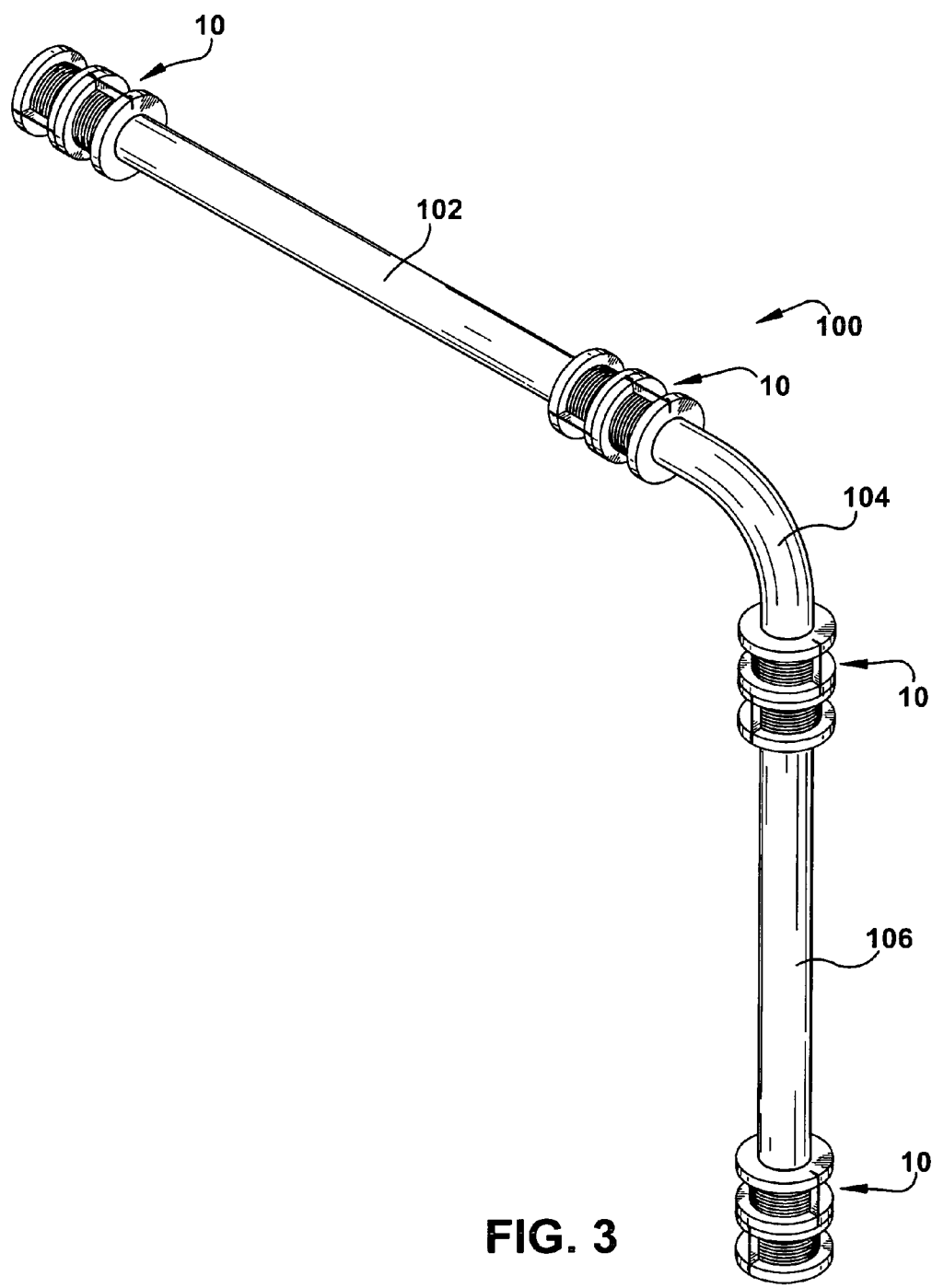
FIG. 3 is an oblique view of a fluid conduit utilizing multiple of the flexible joints of FIG. 1.

FIG. 3 shows a fluid conduit 100 that includes multiple of the flexible joints 10, separated by sections of rigid tubing 102, 104, and 106. The multiple flexible joints 10 may be oriented in multiple orientations, and may result in the system that allows 6 degrees of freedom with regard to placement of one end 110 of the conduit 100 with respect to the opposite end 112 of the conduit 100.

The flexible joint 10 provides a lightweight and mechanically simple way of allowing flexibility in a fluid conduit. Low stress, high reliability, and low expansion are other desirable characteristics of the expansion joint 10. The expansion joint 10 may be used in any of a variety of systems where flexibility in a fluid conduit is desirable. One instance where such a flexible joint 10 may advantageously be utilized in is cryocoolers, which require fluid flow under pressure.

FIGS. 4-7 illustrate certain alternative embodiments of the flexible fluid joint 10. Each of the illustrated embodiments shows a cross-sectional view of an alternative configuration for the section 12 of the flexible joint 10. It will be appreciated that the parts of the alternative configurations shown may be utilized with multiple sections having different orientations of preferred bending axes.

Figure 4:
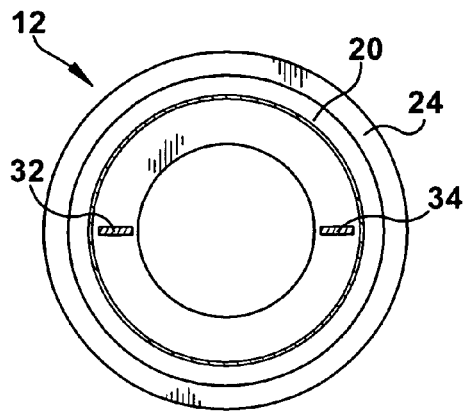
FIG. 4 is a sectional view of a first alternate embodiment fluid conduit flexible joint in accordance with the present invention.

FIG. 4 illustrates an alternate embodiment of the section 12 in which the blade flexures or plates 32 and 34 are inside of the bellows 20. Such a configuration has the advantage of compactness in not having the plates 32 and 34 outside of the bellows 20. In addition, placing the blades or plate 32 and 34 inside the bellows 20 avoids the possibility of objects or components getting caught on or damaging the blade flexures or plates 32 and 34. However, it will be appreciated that in some instances the location of the plates 32 and 34 inside the bellows 20 may undesirably affect fluid flow. Further, placement of the blade flexures or plates 32 and 34 radially outside the bellows 20 may have the advantages of physically constraining outward movement of the bellow 20 and/or of protecting the bellows 20 from damage.

Figure 5:
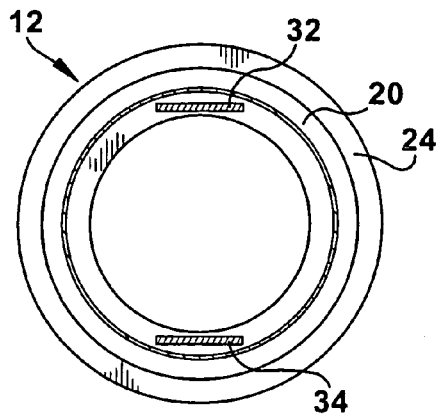
FIG. 5 is a sectional view of a second alternate embodiment fluid conduit flexible joint in accordance with the present invention.

FIG. 5 shows another alternate embodiment of the section 12 of the flexible joint 10, in which the flexure blades or plates 32 and 34 are placed in a substantially circumferential direction, rather than in a radial direction, as was the case in the previous embodiments. The configuration shown in FIG. 5 may be advantageous in that there may be less disruption of fluid flow, compared with the configuration illustrated in FIG. 4. Further, better connection may be made to a less intrusive annular collar, with this configuration.

Figure 7:
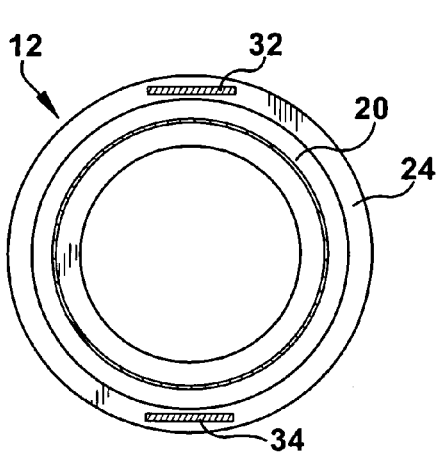
FIG. 7 is a sectional view of the third alternate embodiment fluid conduit flexible joint of FIG. 6.
Figure 6:
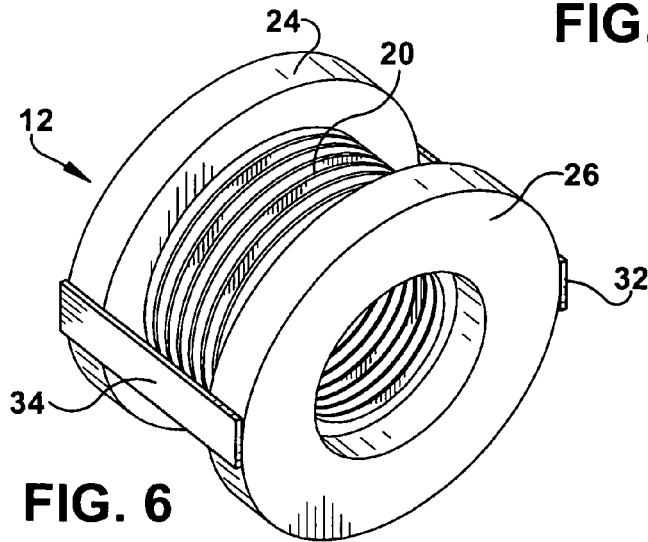
FIG. 6 is an oblique view of a third alternate embodiment fluid conduit flexible joint in accordance with the present invention.

FIGS. 6 and 7 shows a further variant utilizing substantially circumferentially oriented blade flexures or blades 32 and 34 with the blade flexures or plates 32 and 34 located radially outside the bellows 20. The blade flexures or plates 32 and 34 face each other, defining respective planes that are substantially parallel to each other. The configuration shown in FIGS. 6 and 7 carries the advantage of requiring less of a radial extend for the annular collars 24 and 26.

Figure 8:
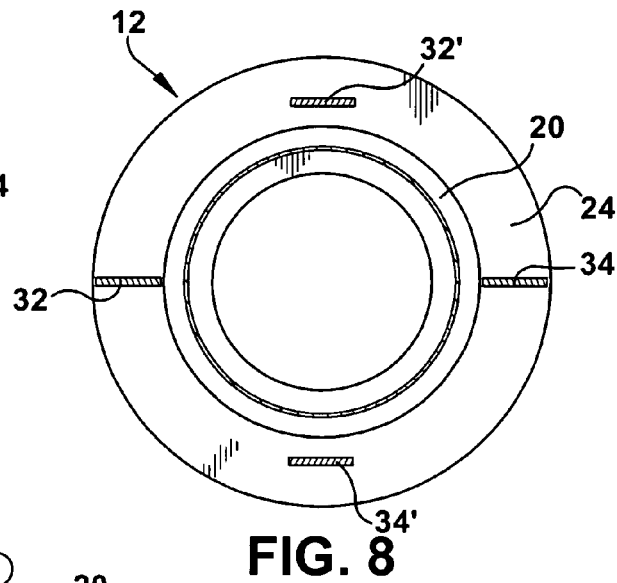
FIG. 8 is a sectional view of a fourth alternate embodiment fluid conduit flexible joint in accordance with the present invention.

FIG. 8 shows a further alternative embodiment, which utilizes two pairs of blade flexures or plates 32, 34, and 32', 34'. The blade flexures 32 and 34 are oriented substantially radially, and are substantially co-planar. The flexures 32' and 34' are generally circumferential, each defining a plane that is parallel to, but offset from, the plane defined by the blade flexures or plates 32 and 34. It will be appreciated that the configuration shown in FIG. 7 advantageously provides physical constraint and protection of the bellows 20 to a greater extent, compared with the two-blade configuration shown in the other embodiments. It will be appreciated that other numbers of blade flexures or plates may be employed as desired, with the blade flexures or plates preferably being all substantially parallel to one another, to advantageously allow for preferable bending about a single axis, while preventing bending of the section 12 about other axes.

The flexible fluid conduit 10 described above provides an inexpensive, lightweight, and reliable way to provide flexibility to fluid conduits for fluids under pressure. It may be utilized in a wide variety of situations, basically any situation in which flexible hoses or flexible tubing is used. It is especially attractive for situations where pressurized fluids are used, and where low weight and high reliability is desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flexible fluid conduit joint comprising:
   a bellows;
   a constraint system mechanically coupled to the bellows; and
   a pair of annular collars attached to opposite longitudinal ends of the bellows;
   wherein the constraint system constrains expansion of the bellows in an axial direction;
   wherein the constraint system allows preferential bending of the bellows about a preferential bending axis;
   wherein the constraint system includes a pair of plates each fixedly attached to both of the collars;
   wherein the plates are planar blade flexures; and
   wherein the bending of the bellows about the preferential bending axis bends the planar blade flexures.

2. The flexible joint of claim 1, wherein the plates are substantially parallel to one another.

3. The flexible joint of claim 1,
   wherein the plates are substantially co-planar; and
   wherein the preferential bending axis is within a plane defined by the plates.

4. The flexible joint of claim 1, wherein the plates are radially outside the bellows.

5. The flexible joint of claim 1, wherein the plates are radially inside the bellows.

6. The flexible joint of claim 1, wherein the bellows is welded to the collars.

7. The flexible joint of claim 1, wherein the plates are diametrically opposed from one another.

8. The flexible joint of claim 1,
   wherein the bellows, the plates, and the collars are parts of a first section; and
   further comprising a second section attached to the first section, wherein the second section includes:
      a second bellows;
      a second pair of annular collars attached to opposite longitudinal ends of the second bellows; and
      a second pair of plates attached to both of the second pair of annular collars;
   wherein the second pair of plates allows preferential bending of the bellows about a second preferential bending axis; and
   wherein the preferential bending axes of the fluid sections are differently oriented from one another.

9. The flexible joint of claim 8, wherein the preferential bending axes are substantially orthogonal to each other.

10. The flexible joint of claim 1, wherein the flexible fluid conduit joint is a part of a cryogenic fluid line.

11. A fluid flow conduit joint comprising:
    plural sections attached to each other, each of the sections including:
       a bellows; and
       a constraint system mechanically coupled to the bellows;
    wherein for each of the sections the constraint system constrains expansion of the bellows in an axial direction;
    wherein for each of the sections the constraint system allows preferential bending of the bellows and the constraint system about a preferential bending axis;
    wherein the preferential bending axes of the sections are canted relative to one another; and
    wherein for each of the sections the constraint system includes a pair of plates each fixedly attached to a pair of collars attached to opposite ends of the bellows.

12. The flexible joint of claim 11, wherein the preferential bending axes of the sections are each substantially orthogonal to a longitudinal axis of the joint.

13. The flexible joint of claim 12, wherein the preferential bending axes are substantially orthogonal to one another.

14. The flexible joint of claim 11, wherein for each of sections the plates are diametrically opposed from one another.

15. A fluid flow conduit comprising:
    a plurality of rigid pipe sections in fluid communication with one another; and
    a plurality of fluid flow joints between respective adjacent pairs of the rigid pipe sections;
    wherein each of the fluid flow joints includes one or more flexible sections;
    wherein each of the flexible sections includes:
       a bellows; and
       a constraint system mechanically coupled to the bellows;
    wherein the constraint system constrains expansion of the bellows in an axial direction;

wherein the constraint system allows preferential bending of the bellows about a preferential bending axis;

wherein each of the sections includes a pair of annular collars attached to opposite longitudinal ends of the bellows;

wherein the constraint system includes a pair of plates each fixedly attached to both of the collars; and wherein bending of the bellows about the preferential bending axis includes bending of the plates.

16. The conduit of claim 15, wherein each of the flow joints includes at least two sections attached together; and wherein, for each of the flow joints, the preferential bending axis of one of the sections is canted relative to the preferential bending axis of another of the sections.

17. The conduit of claim 16, wherein one of the joints is oriented differently than another of the joints.

18. The conduit joint of claim 1, wherein widths of the plates are greater than thicknesses of the plates; and wherein the widths of the plates are oriented in a substantially radial direction.

19. The conduit joint of claim 1, wherein widths of the plates are greater than thicknesses of the plates; and wherein the widths of the plates are oriented in a substantially circumferential direction.

20. The conduit joint of claim 1, wherein the plates are each welded to both of the collars.

* * * * *